(12) United States Patent
Nishimura

(10) Patent No.: US 11,839,937 B2
(45) Date of Patent: Dec. 12, 2023

(54) LEAD-FREE SOLDER ALLOY AND SOLDER JOINT PART

(71) Applicant: NIHON SUPERIOR CO., LTD., Osaka (JP)

(72) Inventor: Tetsuro Nishimura, Osaka (JP)

(73) Assignee: NIHON SUPERIOR CO., LTD., Osaka (JP)

( * ) Notice: Subject to any disclaimer, the term of this patent is extended or adjusted under 35 U.S.C. 154(b) by 0 days.

(21) Appl. No.: 17/272,246

(22) PCT Filed: Apr. 10, 2020

(86) PCT No.: PCT/JP2020/016201
§ 371 (c)(1),
(2) Date: Feb. 26, 2021

(87) PCT Pub. No.: WO2020/209384
PCT Pub. Date: Oct. 15, 2020

(65) Prior Publication Data
US 2022/0016733 A1  Jan. 20, 2022

(30) Foreign Application Priority Data
Apr. 11, 2019 (JP) ................. 2019-075946

(51) Int. Cl.
C22C 13/02 (2006.01)
B23K 35/26 (2006.01)
B23K 103/08 (2006.01)

(52) U.S. Cl.
CPC ............ B23K 35/262 (2013.01); C22C 13/02 (2013.01); B23K 2103/08 (2018.08)

(58) Field of Classification Search
CPC .................................................. B23K 35/262
See application file for complete search history.

(56) References Cited

U.S. PATENT DOCUMENTS

| | | | |
|---|---|---|---|
| 6,156,132 A | 12/2000 | Yamashita et al. | |
| 2015/0037087 A1 | 2/2015 | Tachibana et al. | |
| 2019/0193211 A1 | 6/2019 | Inaba et al. | |
| 2020/0070287 A1* | 3/2020 | Mutuku | B23K 35/264 |

(Continued)

FOREIGN PATENT DOCUMENTS

| | | |
|---|---|---|
| CN | 1919522 A | 2/2007 |
| CN | 102029479 A | 4/2011 |
| CN | 105195915 A | 12/2015 |

(Continued)

OTHER PUBLICATIONS

EPO; Application No. 20786727.6; Extended European Search Report dated Jun. 9, 2021.

(Continued)

*Primary Examiner* — Jophy S. Koshy
(74) *Attorney, Agent, or Firm* — Fitch, Even, Tabin & Flannery LLP

(57) ABSTRACT

A lead-free solder alloy consisting essentially of: 32 mass % or more and 40 mass % or less of Bi; 0.1 mass % or more and 1.0 mass % or less of Sb; 0.1 mass % or more and 1.0 mass % or less of Cu; 0.001 mass % or more and 0.1 mass % or less of Ni; and a remainder of Sn with unavoidable impurities. The lead-free solder alloy further contains specific elements in amounts in predetermined ranges.

12 Claims, 9 Drawing Sheets

(56) References Cited

U.S. PATENT DOCUMENTS

2020/0123634 A1 4/2020 Zhang et al.
2020/0376608 A1 12/2020 Yokoyama et al.

FOREIGN PATENT DOCUMENTS

| CN | 109158795 A | 1/2019 |
|---|---|---|
| EP | 2987876 A1 | 2/2016 |
| JP | 07-040079 A | 2/1995 |
| JP | 2007-090407 A | 4/2007 |
| JP | 2014-140865 A | 8/2014 |
| JP | 5679094 B | 3/2015 |
| JP | 2015-062933 A | 4/2015 |
| JP | 6477965 B1 | 3/2019 |
| WO | 2018/028080 A1 | 2/2018 |
| WO | 2018134673 A1 | 7/2018 |
| WO | 2020/047481 A1 | 3/2020 |

OTHER PUBLICATIONS

INPI; Application No. BR112021020323-0; Technical Examination Report published Mar. 15, 2022.
CNIPA; Application No. 202080004183.8; Office Action dated Jul. 8, 2021.

* cited by examiner

LEAD-FREE SOLDER ALLOY AND SOLDER JOINT PART

CROSS-REFERENCE TO RELATED APPLICATIONS

This application is a U.S. national phase application filed under 35 U.S.C. § 371 of International Application No. PCT/TP2020/016201, filed Apr. 10, 2020, which is based upon and claims the benefit of priority from the prior Japanese Application No. 2019-075946, filed Apr. 11, 2019.

FIELD OF THE INVENTION

The present invention relates to a lead-free solder alloy and a solder joint part.

BACKGROUND OF THE INVENTION

For reduction of burden on the global environment, lead-free solders are prevailing as joint materials for electronic components. As representative compositions for lead-free solders, an Sn—Ag—Cu-based solder alloy and an Sn—Cu—Ni-based solder alloy which are mainly composed of Sn are known. However, the Sn—Ag—Cu-based solder alloy is known to have a melting point of 217° C., and the Sn—Cu—Ni-based solder alloy is known to have a melting point of 227° C., and these melting points are higher than 183° C. which is the melting point of an Sn—Pb eutectic composition which has been conventionally used. Accordingly, for a substrate, of a personal computer, for example, on which electronic components having low heat resistances need to be joined, an Sn—Bi-based or Sn—In-based lead-free solder alloy having a lowered melting point by containing a predetermined amount of Bi or In has been applied.

Meanwhile, blending a large amount of Bi in an Sn—Bi-based solder alloy results in brittleness of the solder alloy, thus causing reduced mechanical strength. Meanwhile, the electronic components and the substrate repeat expansion/contraction due to heat, to cause repeated stress in solder joint parts. This easily causes a crack due to thermal fatigue, and thus the long-term reliability is low. Since In is expensive, use of In is not advantageous in terms of cost.

In order to improve characteristics of an Sn—Bi-based solder alloy, studies have been conducted (Patent Literature 1 to 4).

Patent Literature 1 discloses a solder joint material. This solder joint material contains: a solder alloy represented by an Sn-57 or 45 mass % Bi-x mass % M (where M is at least one metal selected from the group consisting of copper, silver, nickel, germanium, antimony, and indium, and x is 4.0 or smaller); and an arbitrary amount or 5 to 20 mass % of a thermosetting adhesive relative to the solder alloy. According to Patent Literature 1, this configuration allows the reflow temperature to be sufficiently reduced, thereby obtaining a lead-free solder alloy joint having sufficient characteristics as an alternative to an Sn—Pb solder alloy.

Patent Literature 2 discloses a lead-free solder alloy consisting of 20 to 57 wt. % of Bi, 0.2 to 5 wt. % of Sb, 0.01 to 1 wt. % of Ga, and a remainder of Sn. According to Patent Literature 2, this configuration allows soldering to be performed at a low temperature equivalent to or lower than that for soldering of an Sn—Pb solder alloy (eutectic composition), thereby improving workability even at joining of an electronic component susceptible to heat, and assuring good physical characteristics as a solder alloy.

Patent Literature 3 discloses a lead-free solder alloy having an alloy composition of, in mass %. Bi: 31 to 59%, Sb: 0.15 to 0.75%, one or two selected from the group consisting of Cu: 0.3 to 1.0% and P: 0.002 to 0.055%, and a remainder of Sn. According to Patent Literature 3, this configuration allows the lead-free solder alloy to have: a sufficiently low melting point for inhibiting thermal distortion of a substrate during solder-joining; excellent ductility; and high tensile strength. In addition, formation of a P-rich layer at a joining interface during soldering onto an electroless Ni-plated electrode is inhibited to improve shear strength of a solder joint part. Further, a solder joint formed from the solder alloy can assure excellent connection reliability even when a substrate thinner than a conventional substrate is used.

Patent Literature 4 discloses a lead-free solder that contains: Bi added in an amount of 20 to 60 mass %; one or more elements selected from Cu, Ni, and P, with the selected Cu being added in an amount of 0 to 3 mass %, the selected Ni being added in an amount of 0.005 to 0.5 mass %, the selected P being added in an amount of 0.005 to 0.05 mass %; and a remainder of Sn and unavoidable impurities. According to Patent Literature 4, this configuration can provide a lead-free solder that has a melting point lower than that of a leaded solder, and is excellent in fatigue resistance, without using Ag, In, and Sb.

CITATION LIST

Patent Literature

[PTL 1] Japanese Unexamined Patent Application Publication No. 2007-90407
[PTL 2] Japanese Unexamined Patent Application Publication No. H7-40079
[PTL 3] Japanese Patent No. 5679094
[PTL 4] Japanese Unexamined Patent Application Publication No. 2014-140865

SUMMARY OF THE INVENTION

At present, with the prior art as described above, physical characteristics have been improved to some extent while a low level of the melting point of an Sn—Bi-based solder alloy is maintained. However, there is still room for improvement. Therefore, an object of the present invention is to provide a lead-free solder alloy that maintains a low level of the melting point of an Sn—Bi-based solder alloy, has better physical characteristics than those in conventional art, and is capable of forming a joint part having higher reliability than those in conventional art.

The present inventor conducted a thorough study in order to solve the above-described problem, and found that the above-described problem can be solved by containing specific amounts of specific components in an Sn—Bi solder alloy.

A first aspect of the present invention relates to a lead-free solder alloy containing: 32 mass % or more and 40 mass % or less of Bi; 0.1 mass % or more and 1.0 mass % or less of Sb; 0.1 mass % or more and 1.0 mass % or less of Cu; 0.001 mass % or more and 0.1 mass % or less of Ni; and a remainder of Sn with unavoidable impurities.

In the embodiment of the present invention, the lead-free solder alloy may contain 36 mass % or more and 38 mass % or less of Bi.

In the embodiment of the present invention. (1) the lead-free solder alloy may contain 0.3 mass % or less of Ag.

(2) the lead-free solder alloy may contain at least one selected from Fe and Co, wherein a content of each of Fe and Co may be 0.001 mass % or more and 0.1 mass % or less, or (3) the lead-free solder alloy may contain at least one selected from Ga. Mn, V, P, and Ge, wherein a content of each of Ga, Mn, V, P, and Ge may be 0.001 mass % or more and 0.01 mass % or less.

A second aspect of the present invention relates to a solder joint part formed with use of the above-described lead-free solder alloy.

Here, unavoidable impurities refer to those present in raw materials of the solder and those unavoidably mixed in a production step.

According to the present invention, it is possible to provide a lead-free solder alloy that maintains a low level of the melting point of an Sn—Bi-based solder alloy, has better physical characteristics than those in conventional art, and is capable of forming a joint part having higher reliability than those in conventional art.

BRIEF DESCRIPTION OF THE DRAWINGS

FIG. 1B is an enlarged view (1000-fold) of the portion shown in (1) in FIG. 1A. FIG. 1C is an enlarged view (3000-fold) of the portion shown in (2) in FIG. 1A.

DESCRIPTION OF EMBODIMENTS

Figure 1A:
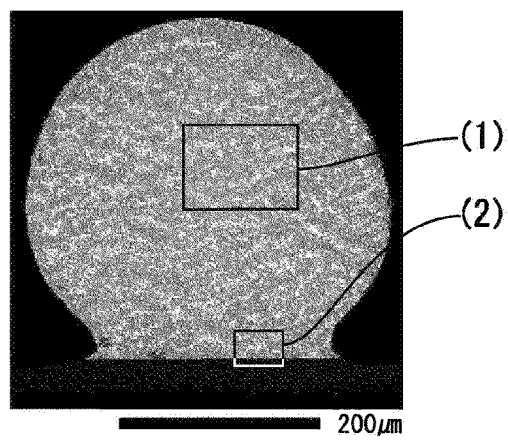
FIG. 1A is an image of a scanning electron microscope (SEM) photograph showing a cross section of a solder joint part between a copper foil substrate and a lead-free solder alloy of Example 1, in an initial state.
Figure 2:
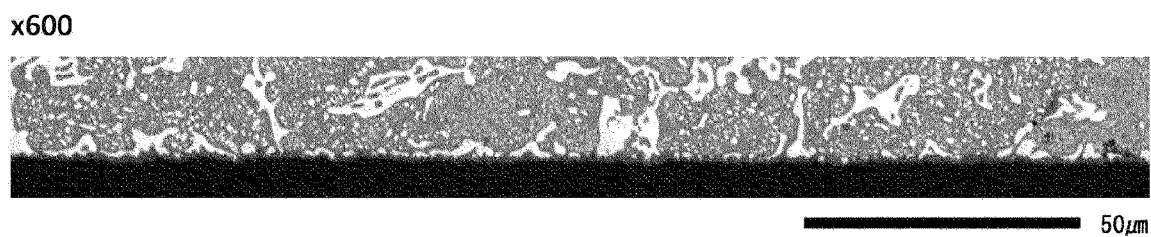
FIG. 2 is an image (600-fold) of an SEM photograph showing a cross section of a joining interface portion of a solder joint part between the copper foil substrate and the lead-free solder alloy of Example 1, in the initial state.
Figure 3A:
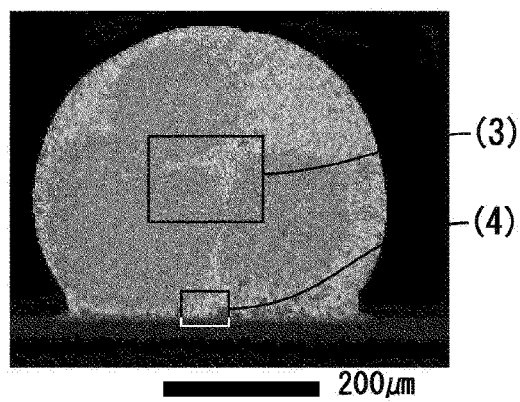
FIG. 3A is an image of an SEM photograph showing a cross section of the solder joint part between the copper foil substrate and the lead-free solder alloy of Example 1, after aging.
Figure 3B:
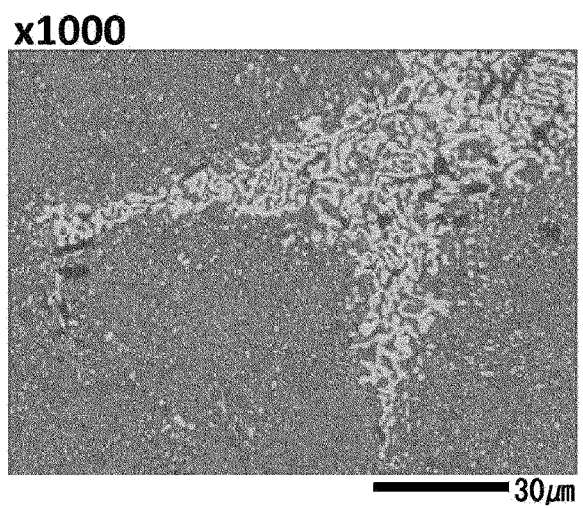
FIG. 3B is an enlarged view of the portion shown in (3) in FIG. 3A.
Figure 3C:
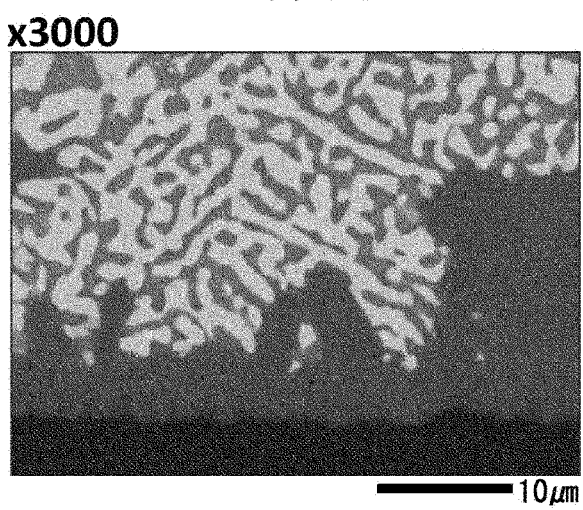
FIG. 3C is an enlarged view of the portion shown in (4) in FIG. 3A.
Figure 4:
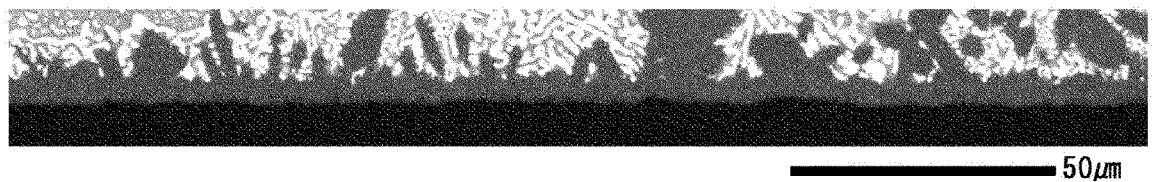
FIG. 4 is an image (600-fold) of an SEM photograph showing a cross section of a joining interface portion of the solder joint part between the copper foil substrate and the lead-free solder alloy of Example 1, after aging.

Hereinafter, embodiments of the present invention are described.

A lead-free solder alloy (hereinafter, this may be simply referred to as "solder alloy") according to an embodiment of the present invention contains: 32 mass % or more and 40 mass % or less of Bi; 0.1 mass % or more and 1.0 mass % or less of Sb; 0.1 mass % or more and 1.0 mass % or less of Cu; 0.001 mass % or more and 0.1 mass % or less of Ni; and a remainder of Sn with unavoidable impurities.

When Sn is used as a parent phase, and Bi, Sb, Cu, and Ni are contained in amounts in specific ranges, a melting point lowering effect due to Bi can be maintained in a favorable manner, and at the same time, decrease in physical characteristics due to Bi can be significantly prevented. In particular, deterioration in long-term use can be prevented, and good thermal fatigue resistance can be obtained. Accordingly, a highly reliable solder joint part can be formed. Meanwhile, Sb, Cu, and Ni are each an element having a lower volume resistivity than Bi. In addition, Bi is contained in an amount smaller than an amount thereof when Bi is contained in the form of a composition similar to a eutectic composition with Sn. Accordingly, the volume resistivity of the solder alloy can be decreased as compared to those in conventional arts.

Since the solder alloy has a specific component composition, it is possible to inhibit $Cu_6Sn_5\eta\text{-}\eta'$ modification that occurs at 186° C. at a metal interface in the solder alloy, which is, for example, an interface between a metal wire on the substrate and the solder alloy. As a result, occurrence of a crack inside the solder alloy and interfacial peeling between the solder alloy and a metal wire are prevented, whereby a highly reliable joint part can be formed.

Since the solder alloy has a specific component composition, occurrence of electromigration can be inhibited. The mechanism of action thereof is not clarified. However, movement of metal atoms in the solder alloy, which may be caused by application of current and/or a high temperature environment, can be inhibited, so that loss of the solder alloy can be inhibited, and a highly reliable joint part can be formed.

The content of Bi is 32 mass % or more and 40 mass % or less. When the content is less than 32 mass %, the melting point lowering effect is likely to be insufficient. When the content is greater than 40 mass %, the solder alloy becomes brittle, and desired physical characteristics are less likely to be obtained. The content of Bi may be in this range, and preferably, 36 mass % or more and 38 mass % or less.

The content of Sb is 0.1 mass % or more and 1.0 mass % or less. Preferably, the content is 0.1 mass % or more and 0.6 mass % or less. It is known that Sb has actions of providing ductility to an Sn—Bi solder alloy and of inhibiting volume change by inhibiting phase change from β-Sn to α-Sn. However, it should be noted that the various effects as described above are exhibited only when Sb is contained in such a range in relation to other metal components.

The content of Cu is 0.1 mass % or more and 1.0 mass % or less. Preferably, the content is 0.3 mass % or more and 0.7 mass % or less. Cu is known to have an action of providing ductility to an Sn—Bi solder alloy. However, it should be noted that the various effects as described above are exhibited only when Cu is contained in such a range in relation to other metal components.

The content of Ni is 0.001 mass % or more and 0.1 mass % or less. The content is preferably 0.005 mass % or more and 0.07 mass % or less, and more preferably 0.01 mass % or more and 0.05 mass % or less. Ni is known to have an action of inhibiting generation of an intermetallic compound of Cu and Sn and inhibiting increase in the melting point and decrease in fluidity, and an action of improving strength and bondability of an alloy. However, it should be noted that an effect of inhibiting $Cu_6Sn_5\eta$-$\eta'$ modification that occurs at 186° C. is exhibited only when Ni is contained in such a range in relation to other metal components.

The solder alloy according to the embodiment may contain Sn and as necessary, an element other than Bi, Sb, Cu, and Ni. Examples of such an element include Ag, Fe, Co, Ga, Mn, V, Ge, P, Si, Ca, Ti, and the like. Among these, Ag, Fe, Co, Ga, Mn, V, Ge, and P are preferable, and Ge, Ag, Fe, Co, Ga, Mn, V are more preferable.

Ag can improve wettability of the solder alloy. In view of the improvement in wettability, the content of Ag is preferably 0.3 mass % or less, and more preferably 0.1 mass % or less. Here, when treatment is performed at a high temperature, as in aging treatment, for example, particles of $Ag_3Sn$ that is an intermetallic compound are generated and coarsened, whereby the long-term reliability is likely to be reduced. In addition, since Ag is expensive in general, the production cost of the solder alloy is increased. Therefore, the less the content of Ag is, the better it is.

Fe and Co each have an action of stabilizing the solder joint part. When iron corrosion of the tip or a nozzle of a soldering iron needs to be prevented, Fe and Co may be contained. Preferably, the contents of these are each 0.001 mass % or more and 0.1 mass % or less.

Ge, Ga, Mn, V, and P each have an effect of preventing oxidation of the surface of the solder alloy. Among these, Ge, Ga, Mn, and V are preferable. When the surface of the solder alloy is oxidized and an oxide film is formed, water generated upon the reduction of the oxide film during solder-joining may cause a void. Accordingly, inhibiting of the oxidation of the surface reduces the thickness of the oxide film, and this reduction in thickness is considered to be advantageous for the joining quality and reliability. Preferably, the contents of these are each 0.001 mass % or more and 0.01 mass % or less. Ge also has an effect of improving creep strength.

Si, Ca, and Ti also each have an effect of preventing oxidation of the surface of the solder alloy. Preferably, the contents of these are each 0.001 mass % or more and 0.01 mass % or less.

The solder alloy according to the embodiment may contain unavoidable impurities. However, even when unavoidable impurities are contained, the above-described effects can be exhibited.

The form of the solder alloy is not limited in particular, and can be selected as appropriate according to usage. For example, the solder alloy may be in a bar shape for performing solder-joining by dip soldering. The solder alloy may be in a non-rigid form in a paste state, a ball-like shape, or a preform shape for performing solder-joining by reflow soldering. A resin flux cored solder in a linear shape may be adopted for performing solder-joining with use of a soldering iron.

The solder joint part according to the embodiment of the present invention is formed with use of the above-described solder alloy. More specifically, at the solder joint part, for example, an electrode terminal of an electronic component and an electrode terminal of a metal wire or the like on a substrate are joined together by the above-described solder alloy. Since the solder joint part is formed with use of the above-described solder alloy, deterioration of the solder joint part due to long-term use of the solder alloy is inhibited, and thus, the solder joint part has good thermal fatigue resistance and high reliability.

EXAMPLE

In the following, the embodiment according to the present invention is described in more detail on the basis of Examples.

Examples 1 to 36 and Comparative Examples 1 to 14

In order to prepare solder alloys, the metals were mixed according to a fixed method for obtaining the compositions shown in Tables 1 to 3. Using the prepared solder alloys, evaluation tests were conducted according to the method described below. Since metals as raw materials are mixed at composition ratios shown in Tables 1 to 3, each solder alloy contains unavoidable impurities caused by the raw materials.

TABLE 1

| | Alloy composition (mass %) | | | | | |
|---|---|---|---|---|---|---|
| | Sn | Bi | Sb | Cu | Ni | Total |
| Example 1 | 61.970 | 37.000 | 0.500 | 0.500 | 0.030 | 100.000 |
| Example 2 | 67.799 | 32.000 | 0.100 | 0.100 | 0.001 | 100.000 |
| Example 3 | 63.390 | 36.000 | 0.300 | 0.300 | 0.010 | 100.000 |
| Example 4 | 60.630 | 38.000 | 0.600 | 0.700 | 0.070 | 100.000 |
| Example 5 | 57.900 | 40.000 | 1.000 | 1.000 | 0.100 | 100.000 |
| Example 6 | 63.599 | 36.000 | 0.100 | 0.300 | 0.001 | 100.000 |
| Example 7 | 62.195 | 37.000 | 0.300 | 0.500 | 0.005 | 100.000 |
| Example 8 | 60.690 | 38.000 | 0.600 | 0.700 | 0.010 | 100.000 |
| Example 9 | 59.000 | 39.000 | 1.000 | 0.900 | 0.100 | 100.000 |
| Example 10 | 66.595 | 33.000 | 0.300 | 0.100 | 0.005 | 100.000 |

TABLE 1-continued

| | Alloy composition (mass %) | | | | | |
|---|---|---|---|---|---|---|
| | Sn | Bi | Sb | Cu | Ni | Total |
| Example 11 | 64.190 | 35.000 | 0.500 | 0.300 | 0.010 | 100.000 |
| Example 12 | 62.870 | 36.000 | 0.600 | 0.500 | 0.030 | 100.000 |
| Example 13 | 60.550 | 38.000 | 0.700 | 0.700 | 0.050 | 100.000 |
| Example 14 | 59.030 | 39.000 | 0.900 | 1.000 | 0.070 | 100.000 |
| Example 15 | 66.399 | 33.000 | 0.300 | 0.300 | 0.001 | 100.000 |
| Example 16 | 64.995 | 34.000 | 0.500 | 0.500 | 0.005 | 100.000 |
| Example 17 | 63.590 | 35.000 | 0.700 | 0.700 | 0.010 | 100.000 |
| Example 18 | 61.970 | 36.000 | 1.000 | 1.000 | 0.030 | 100.000 |
| Example 19 | 61.850 | 37.000 | 1.000 | 0.100 | 0.050 | 100.000 |
| Example 20 | 60.530 | 38.000 | 0.700 | 0.700 | 0.070 | 100.000 |
| Example 21 | 59.400 | 39.000 | 0.500 | 1.000 | 0.100 | 100.000 |

TABLE 2

| | Alloy composition (mass %) | | | | | | | | | | | | | |
|---|---|---|---|---|---|---|---|---|---|---|---|---|---|---|
| | Sn | Bi | Sb | Cu | Ni | Ag | Fe | Co | Ga | Mn | V | P | Ge | Total |
| Example 22 | 63.090 | 36.000 | 0.300 | 0.300 | 0.010 | 0.300 | — | — | — | — | — | — | — | 100.000 |
| Example 23 | 63.394 | 36.000 | 0.300 | 0.300 | 0.005 | — | 0.001 | — | — | — | — | — | — | 100.000 |
| Example 24 | 61.750 | 37.000 | 0.600 | 0.500 | 0.050 | — | 0.100 | — | — | — | — | — | — | 100.000 |
| Example 25 | 63.389 | 36.000 | 0.300 | 0.300 | 0.010 | — | — | 0.001 | — | — | — | — | — | 100.000 |
| Example 26 | 61.770 | 37.000 | 0.600 | 0.500 | 0.030 | — | — | 0.100 | — | — | — | — | — | 100.000 |
| Example 27 | 63.389 | 36.000 | 0.300 | 0.300 | 0.010 | — | — | — | 0.001 | — | — | — | — | 100.000 |
| Example 28 | 60.640 | 38.000 | 0.600 | 0.700 | 0.050 | — | — | — | 0.010 | — | — | — | — | 100.000 |
| Example 29 | 63.389 | 36.000 | 0.300 | 0.300 | 0.010 | — | — | — | — | 0.001 | — | — | — | 100.000 |
| Example 30 | 60.640 | 38.000 | 0.600 | 0.700 | 0.050 | — | — | — | — | 0.010 | — | — | — | 100.000 |
| Example 31 | 63.389 | 36.000 | 0.300 | 0.300 | 0.010 | — | — | — | — | — | 0.001 | — | — | 100.000 |
| Example 32 | 60.640 | 38.000 | 0.600 | 0.700 | 0.050 | — | — | — | — | — | 0.010 | — | — | 100.000 |
| Example 33 | 63.389 | 36.000 | 0.300 | 0.300 | 0.010 | — | — | — | — | — | — | 0.001 | — | 100.000 |
| Example 34 | 60.640 | 38.000 | 0.600 | 0.700 | 0.050 | — | — | — | — | — | — | 0.010 | — | 100.000 |
| Example 35 | 63.389 | 36.000 | 0.300 | 0.300 | 0.010 | — | — | — | — | — | — | — | 0.001 | 100.000 |
| Example 36 | 60.640 | 38.000 | 0.600 | 0.700 | 0.050 | — | — | — | — | — | — | — | 0.010 | 100.000 |

TABLE 3

| | Alloy composition (mass %) | | | | | | | | |
|---|---|---|---|---|---|---|---|---|---|
| | Sn | Bi | Sb | Cu | Ni | Ag | Fe | Co | Total |
| Comparative Example 1 | 60.000 | 38.000 | 1.000 | 0.700 | — | 0.300 | — | — | 100.000 |
| Comparative Example 2 | 42.000 | 58.000 | — | — | — | — | — | — | 100.000 |
| Comparative Example 3 | 96.500 | — | — | 0.500 | — | 3.000 | — | — | 100.000 |
| Comparative Example 4 | 67.995 | 31.000 | 0.500 | 0.500 | 0.005 | — | — | — | 100.000 |
| Comparative Example 5 | 57.850 | 41.000 | 0.600 | 0.500 | 0.050 | — | — | — | 100.000 |
| Comparative Example 6 | 67.870 | 32.000 | — | 0.100 | 0.030 | — | — | — | 100.000 |
| Comparative Example 7 | 57.730 | 40.000 | 1.200 | 1.000 | 0.070 | — | — | — | 100.000 |
| Comparative Example 8 | 67.899 | 32.000 | 0.100 | — | 0.001 | — | — | — | 100.000 |
| Comparative Example 9 | 57.700 | 40.000 | 1.000 | 1.200 | 0.100 | — | — | — | 100.000 |
| Comparative Example 10 | 67.800 | 32.000 | 0.100 | 0.100 | — | — | — | — | 100.000 |
| Comparative Example 11 | 59.250 | 40.000 | 0.100 | 0.500 | 0.150 | — | — | — | 100.000 |
| Comparative Example 12 | 60.150 | 38.000 | 0.600 | 0.700 | 0.050 | 0.500 | — | — | 100.000 |
| Comparative Example 13 | 60.030 | 38.000 | 1.000 | 0.700 | 0.070 | — | 0.200 | — | 100.000 |
| Comparative Example 14 | 60.050 | 38.000 | 1.000 | 0.700 | 0.050 | — | — | 0.200 | 100.000 |

3) The resultant object obtained in 2) was subjected to reflow-heating under a condition of temperature rise at 1.5° C./second and a maximum temperature of 200° C. or 250° C. for 50 seconds, to join the copper foil substrate and the ball, and was then cooled and washed with IPA to remove the flux. The thus obtained object was used as a measurement sample.

4) A part of the measurement sample prepared in the above procedure was left to stand for 100 hours in an electric furnace kept at 150° C., to perform aging treatment.

5) A measurement sample (initial) not subjected to the aging treatment and a measurement sample (aging) subjected to the aging treatment were set on an impact shear tester (4000HS manufactured by DAGE).

(Evaluation)

<Impact Shear Test>

1) Spherical solder balls each having a diameter of 0.5 mm and respectively made of solder alloys obtained in Examples 1 to 36 and Comparative Examples 1 to 14 were prepared.

2) A copper foil substrate was prepared, 0.01 g of "Flux RM-5" (manufactured by NIHON SUPERIOR CO., LTD.) was applied to an implementation portion, and then a solder ball was put thereon.

Figure 5:
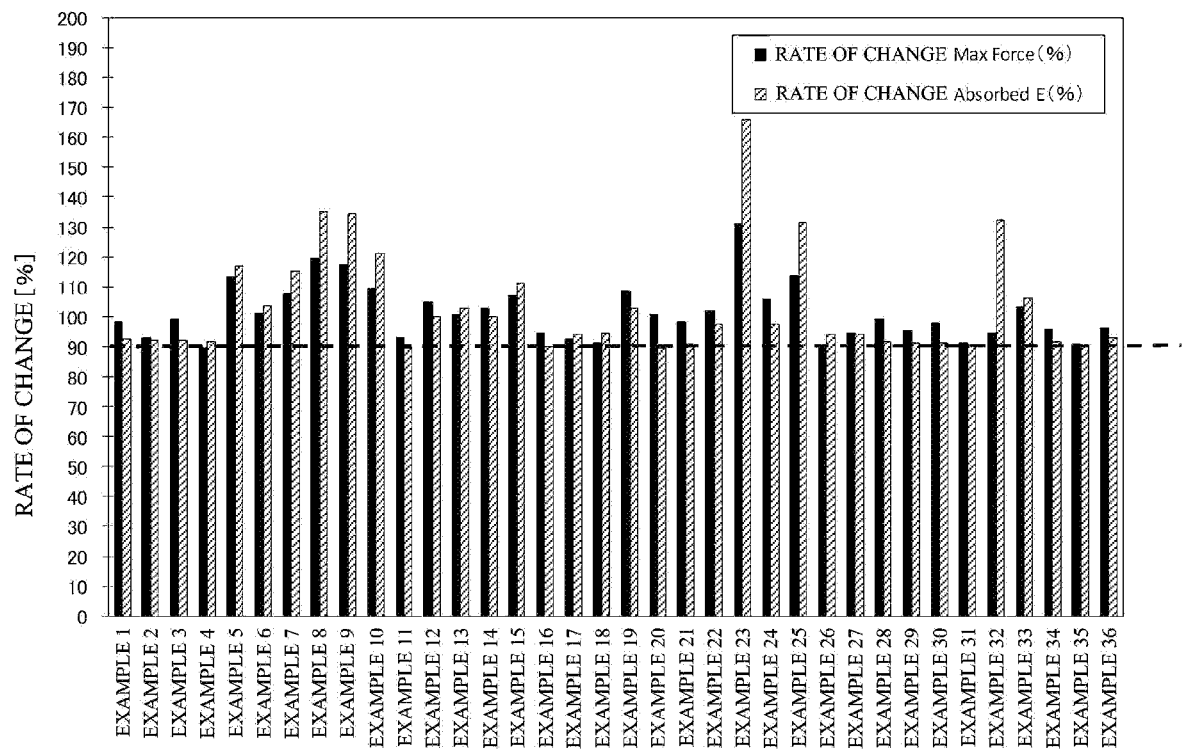
FIG. 5 shows the rate of change (aging/initial×100) in each of absorbed energy and joining strength between a measurement sample (initial) not subjected to aging treatment and a measurement sample (aging) subjected to aging treatment, in an impact shear test performed at a shear speed of 10 mm/s, using each of solder alloys of Examples 1 to 36.
Figure 6:
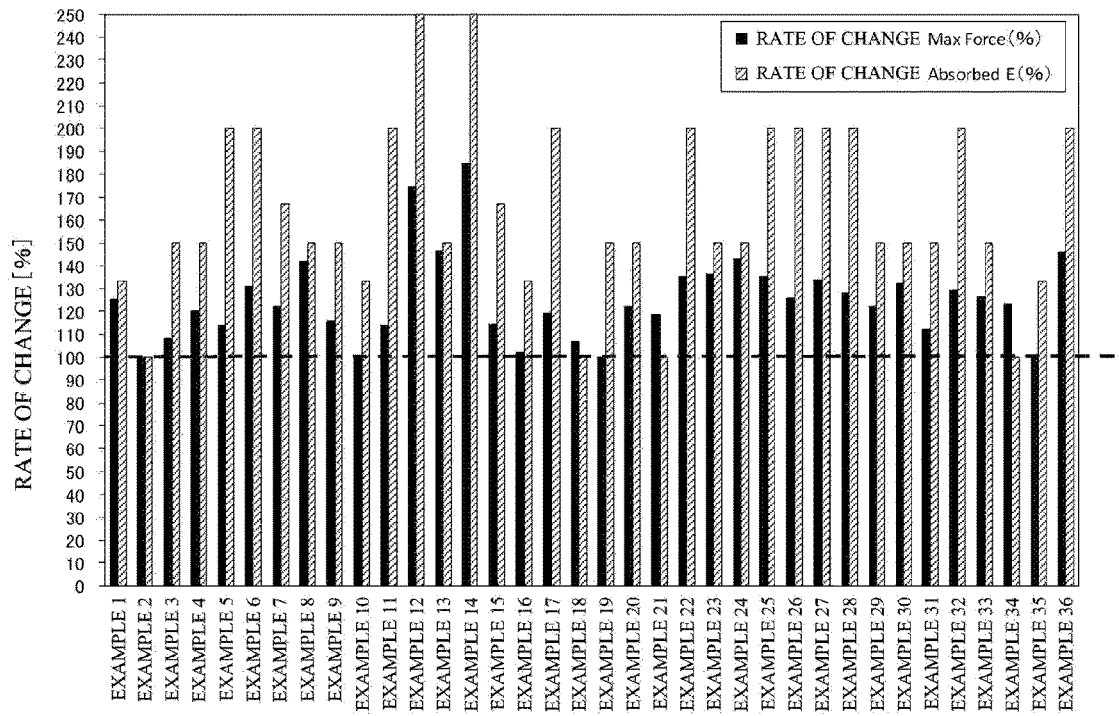
FIG. 6 shows the rate of change (aging/initial×100) in each of absorbed energy and joining strength between a measurement sample (initial) not subjected to aging treatment and a measurement sample (aging) subjected to aging treatment, in an impact shear test performed at a shear speed of 1000 mm/s, using each of the solder alloys of Examples 1 to 36.
Figure 7:
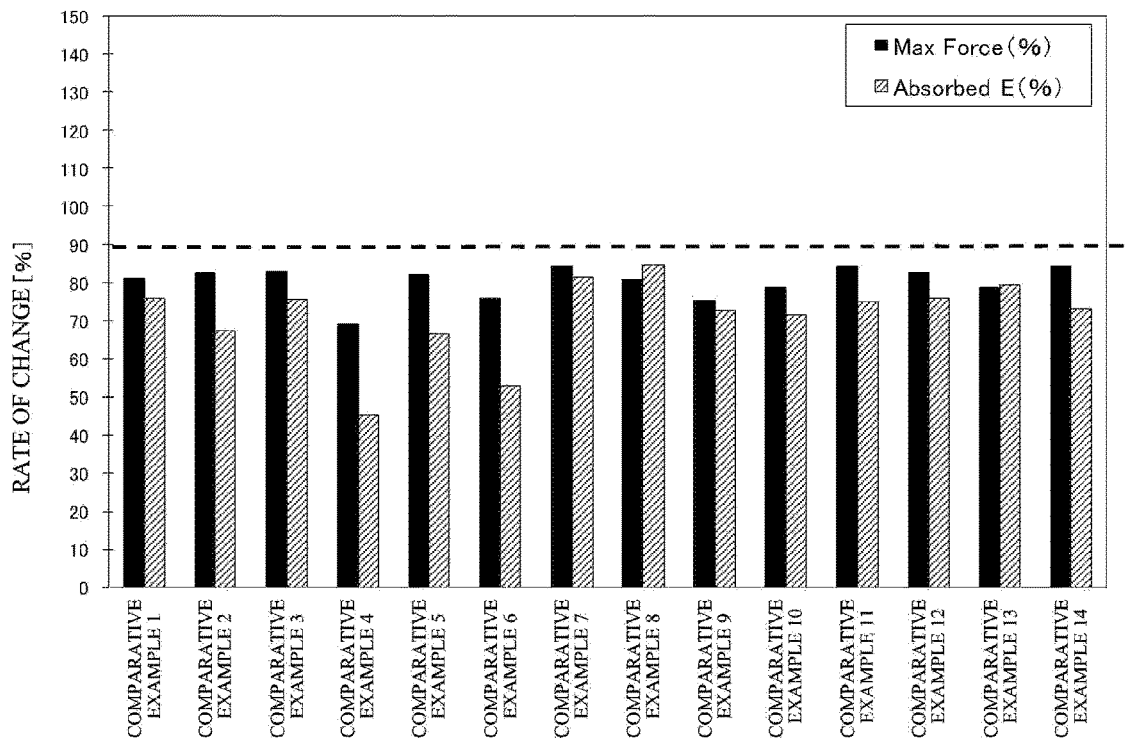
FIG. 7 shows the rate of change (aging/initial×100) in each of absorbed energy and joining strength between a measurement sample (initial) not subjected to aging treatment and a measurement sample (aging) subjected to aging treatment, in an impact shear test performed at a shear speed of 10 mm/s, using each of solder alloys of Comparative Examples 1 to 14.
Figure 8:
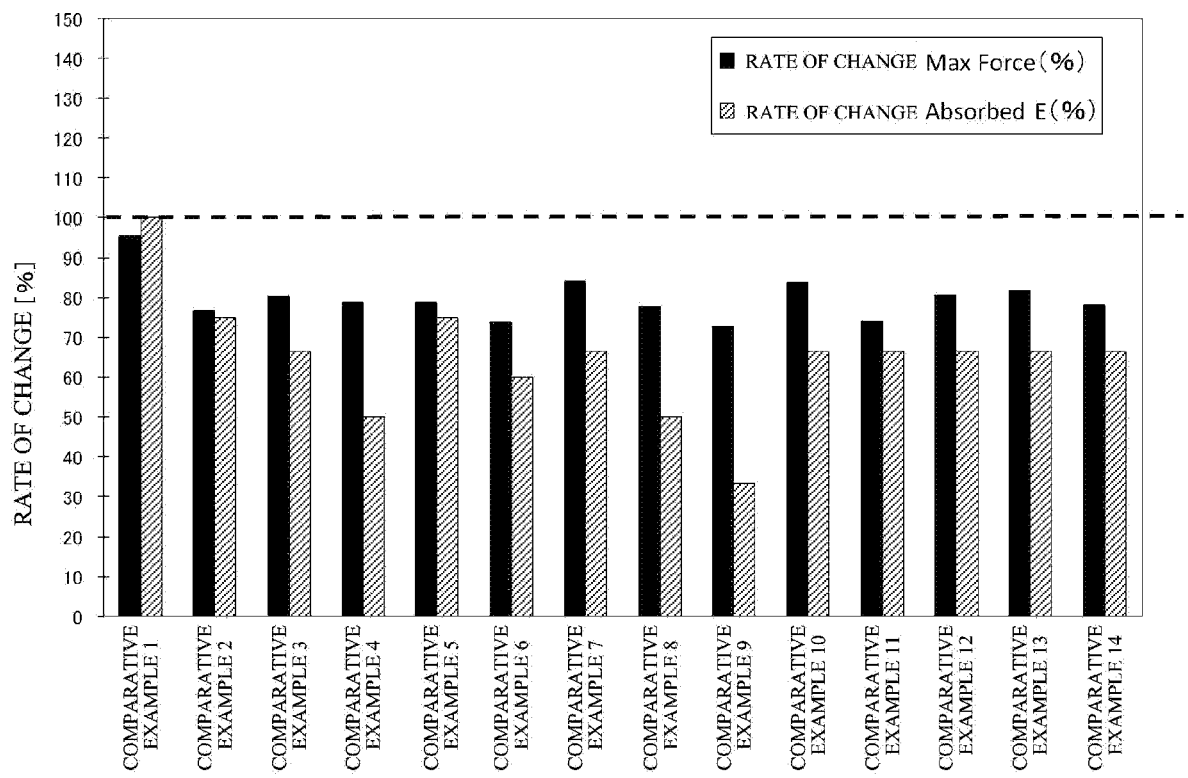
FIG. 8 shows the rate of change (aging/initial×100) in each of absorbed energy and joining strength between a measurement sample (initial) not subjected to aging treatment and a measurement sample (aging) subjected to aging treatment, in an impact shear test performed at a shear speed of 1000 mm/s, using the solder alloys of Comparative Examples 1 to 14.
Figure 9A:
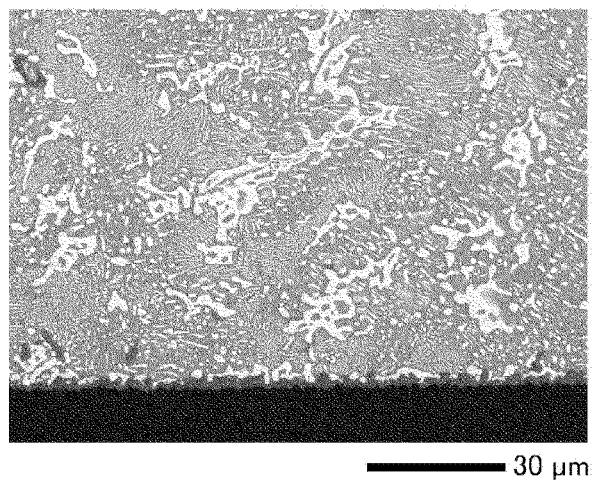
FIG. 9A is an image of an SEM photograph (1000-fold) showing a cross section of a solder joint part between a copper foil substrate and a lead-free solder alloy of Example 3, in an initial state.
Figure 9B:
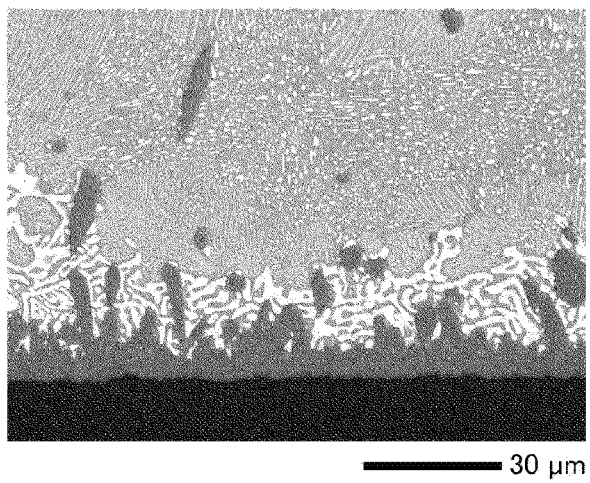
FIG. 9B is an image of an SEM photograph (1000-fold) showing a cross section of a solder joint part between the copper foil substrate and the lead-free solder alloy of Example 3, after aging treatment.
Figure 10A:
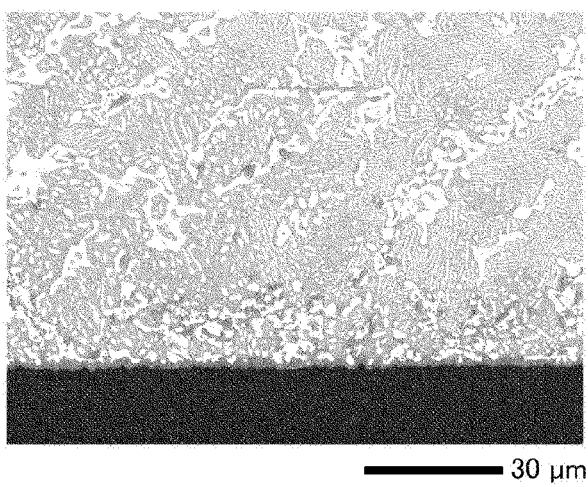
FIG. 10A is an image of an SEM photograph (1000-fold) showing a cross section of a solder joint part between a copper foil substrate and a lead-free solder alloy of Example 4, in an initial state.
Figure 10B:
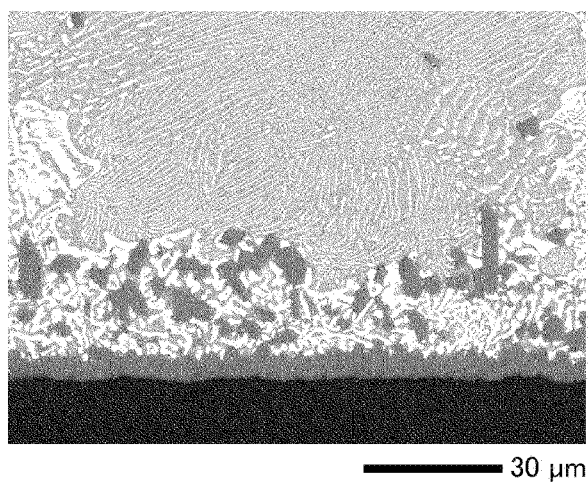
FIG. 10B is an image of an SEM photograph (1000-fold) showing a cross section of a solder joint part between the copper foil substrate and the lead-free solder alloy of Example 4, after aging treatment.
Figure 11A:
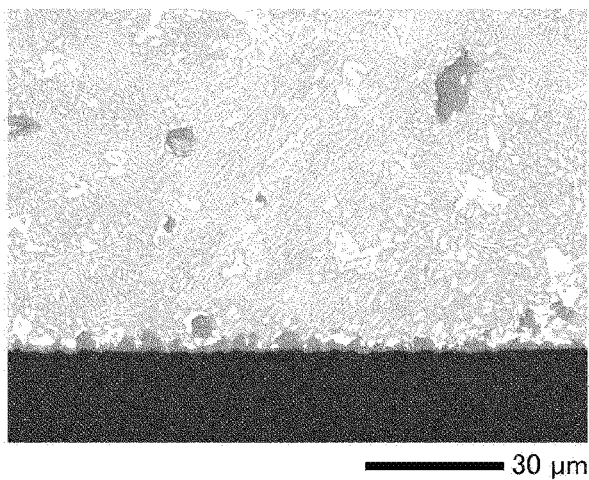
FIG. 11A is an image of an SEM photograph (1000-fold) showing a cross section of a solder joint part between a copper foil substrate and a lead-free solder alloy of Comparative Example 4, in an initial state.
Figure 11B:
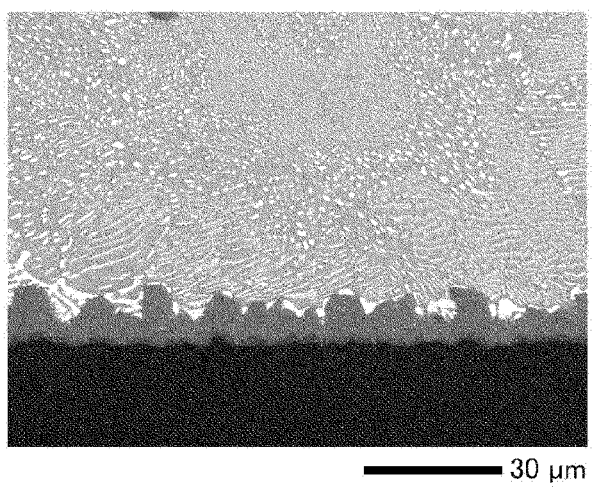
FIG. 11B is an image of an SEM photograph (1000-fold) showing a cross section of a solder joint part between the copper foil substrate and the lead-free solder alloy of Comparative Example 4, after aging treatment.
Figure 12A:
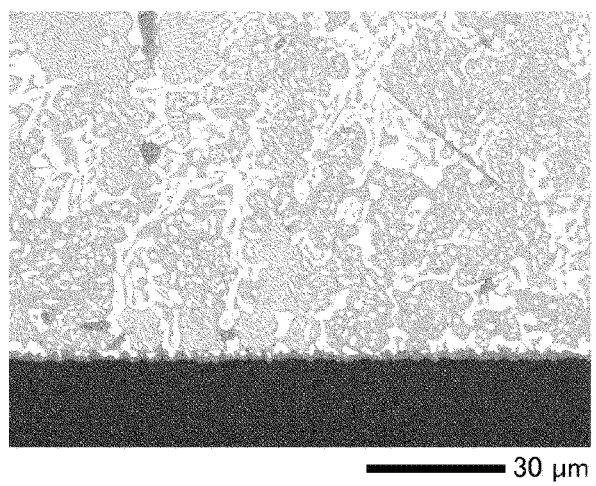
FIG. 12A is an image of an SEM photograph (1000-fold) showing a cross section of a solder joint part between a copper foil substrate and a lead-free solder alloy of Comparative Example 5, in an initial state.
Figure 12B:
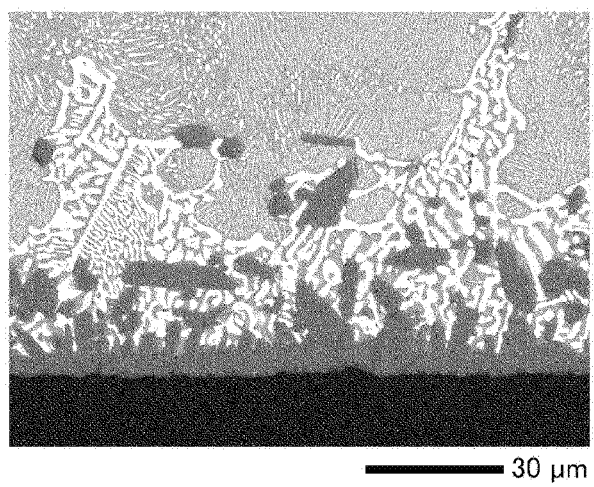
FIG. 12B is an image of an SEM photograph (1000-fold) showing a cross section of a solder joint part between the copper foil substrate and the lead-free solder alloy of Comparative Example 5, after aging treatment.

6) The measurement conditions were as follows. Shear load stress (N) and absorbed energy (Absorbed E) (mJ) were measured by using three shear speeds of 10 mm/second, 1000 mm/second, and 2000 mm/second for Example 1 and Comparative Example 1, and two shear speeds of 10 mm/second and 1000 mm/second for Examples 2 to 36 and Comparative Examples 2 to 14. A maximum value (Max force) of the shear load stress was evaluated as the joining strength. With respect to the cases of the shear speed of 10 mm/second and 1000 mm/second, the rate of change (after aging/ initial×100) of measurement values of "initial" and "after aging" was calculated, and influence of the aging was evaluated. Tables 4 to 8 show the measurement results. Tables 5 and 7 show the results of Examples 1 to 36 and Comparative Examples 1 to 14 in the case of the shear speed of 10 mm/second. Tables 6 and 8 show the results of Examples 1 to 36 and Comparative Examples 1 to 14 in the case of the shear speed of 1000 mm/second. FIGS. 5 to 8 show bar graphs of the "rate of change" indicated in Tables 5 to 8. FIGS. 5 and 7 are each provided with a broken line serving as a reference at the position of the rate of change being 90%. FIGS. 6 and 8 are each provided with a broken line serving as a reference at the position of the rate of change being 100%.

TABLE 4

| | | Initial | | Aging 150° C. × 100 hours | |
|---|---|---|---|---|---|
| | Shear speed [mm/s] | Max Force [N] | Absorbed E [mJ] | Max Force [N] | Absorbed E [mJ] |
| Example 1 | 10 | 12.8 | 5.3 | 12.6 | 4.9 |
| | 1000 | 9.4 | 0.3 | 11.8 | 0.4 |
| | 2000 | 7.5 | 0.3 | 10.2 | 0.5 |
| Comparative Example 1 | 10 | 9.5 | 2.9 | 7.7 | 2.2 |
| | 1000 | 6.6 | 0.2 | 6.3 | 0.2 |
| | 2000 | 4.0 | 0.1 | 5.6 | 0.2 |

TABLE 5

| | | Initial | | Aging | | Rate of change | |
|---|---|---|---|---|---|---|---|
| | Melting point (° C.) | Max Force (N) | Absorbed E (mJ) | Max Force (N) | Absorbed E (mJ) | Max Force (%) | Absorbed E (%) |
| Example 1 | 174 | 12.8 | 5.3 | 12.6 | 4.9 | 98 | 92 |
| Example 2 | 194 | 11.3 | 3.8 | 10.5 | 3.5 | 93 | 92 |
| Example 3 | 188 | 10.5 | 3.7 | 10.4 | 3.4 | 99 | 92 |
| Example 4 | 185 | 10.5 | 3.6 | 9.4 | 3.3 | 90 | 92 |
| Example 5 | 182 | 10.0 | 3.5 | 11.3 | 4.1 | 113 | 117 |
| Example 6 | 188 | 9.5 | 2.8 | 9.6 | 2.9 | 101 | 104 |
| Example 7 | 186 | 10.1 | 3.3 | 10.9 | 3.8 | 108 | 115 |
| Example 8 | 185 | 10.4 | 3.7 | 12.4 | 5.0 | 119 | 135 |
| Example 9 | 183 | 9.9 | 3.2 | 11.6 | 4.3 | 117 | 134 |
| Example 10 | 192 | 10.5 | 3.8 | 11.5 | 4.6 | 110 | 121 |
| Example 11 | 189 | 11.4 | 3.9 | 10.6 | 3.5 | 93 | 90 |
| Example 12 | 188 | 10.0 | 3.4 | 10.5 | 3.4 | 105 | 100 |
| Example 13 | 185 | 10.6 | 3.7 | 10.7 | 3.8 | 101 | 103 |
| Example 14 | 183 | 10.0 | 3.4 | 10.3 | 3.4 | 103 | 100 |
| Example 15 | 192 | 10.3 | 3.6 | 11.0 | 4.0 | 107 | 111 |
| Example 16 | 191 | 10.6 | 4.0 | 10.0 | 3.6 | 94 | 90 |
| Example 17 | 189 | 10.8 | 3.5 | 10.0 | 3.3 | 93 | 94 |
| Example 18 | 188 | 10.4 | 3.7 | 9.5 | 3.5 | 91 | 95 |
| Example 19 | 186 | 10.2 | 3.8 | 11.1 | 3.9 | 109 | 103 |
| Example 20 | 185 | 10.6 | 3.9 | 10.7 | 3.5 | 101 | 90 |
| Example 21 | 183 | 11.1 | 4.4 | 10.9 | 4.0 | 98 | 91 |
| Example 22 | 188 | 10.3 | 3.7 | 10.5 | 3.6 | 102 | 97 |
| Example 23 | 188 | 10.0 | 3.5 | 13.1 | 5.8 | 131 | 166 |
| Example 24 | 186 | 10.7 | 4.0 | 11.3 | 3.9 | 106 | 98 |
| Example 25 | 188 | 10.2 | 3.8 | 11.6 | 5.0 | 114 | 132 |
| Example 26 | 186 | 9.9 | 3.4 | 8.9 | 3.2 | 90 | 94 |
| Example 27 | 188 | 10.9 | 3.4 | 10.3 | 3.2 | 94 | 94 |
| Example 28 | 185 | 10.2 | 3.6 | 10.1 | 3.3 | 99 | 92 |
| Example 29 | 188 | 10.4 | 3.4 | 9.9 | 3.1 | 95 | 91 |
| Example 30 | 185 | 9.9 | 3.4 | 9.7 | 3.1 | 98 | 91 |
| Example 31 | 188 | 10.0 | 4.1 | 9.1 | 3.7 | 91 | 90 |
| Example 32 | 185 | 10.7 | 4.0 | 10.1 | 5.3 | 94 | 133 |
| Example 33 | 188 | 9.6 | 3.3 | 9.9 | 3.5 | 103 | 106 |
| Example 34 | 185 | 9.9 | 3.5 | 9.5 | 3.2 | 96 | 91 |
| Example 35 | 188 | 11.0 | 4.0 | 10.0 | 3.6 | 91 | 90 |
| Example 36 | 185 | 10.7 | 4.1 | 10.3 | 3.8 | 96 | 93 |

TABLE 6

|  | Melting point (° C.) | Initial Max Force (N) | Initial Absorbed E (mJ) | Aging Max Force (N) | Aging Absorbed E (mJ) | Rate of change Max Force (%) | Rate of change Absorbed E (%) |
|---|---|---|---|---|---|---|---|
| Example 1 | 174 | 9.4 | 0.3 | 11.8 | 0.4 | 126 | 133 |
| Example 2 | 194 | 10.1 | 0.3 | 10.1 | 0.3 | 100 | 100 |
| Example 3 | 188 | 7.3 | 0.2 | 7.9 | 0.3 | 108 | 150 |
| Example 4 | 185 | 7.4 | 0.2 | 8.9 | 0.3 | 120 | 150 |
| Example 5 | 182 | 7.8 | 0.2 | 8.9 | 0.4 | 114 | 200 |
| Example 6 | 188 | 9.0 | 0.3 | 11.8 | 0.6 | 131 | 200 |
| Example 7 | 186 | 8.9 | 0.3 | 10.9 | 0.5 | 122 | 167 |
| Example 8 | 185 | 6.7 | 0.2 | 9.5 | 0.3 | 142 | 150 |
| Example 9 | 183 | 7.7 | 0.2 | 8.9 | 0.3 | 116 | 150 |
| Example 10 | 192 | 9.9 | 0.3 | 9.9 | 0.4 | 100 | 133 |
| Example 11 | 189 | 8.7 | 0.2 | 9.9 | 0.4 | 114 | 200 |
| Example 12 | 188 | 6.3 | 0.1 | 11.0 | 0.5 | 175 | 500 |
| Example 13 | 185 | 7.1 | 0.2 | 10.4 | 0.3 | 146 | 150 |
| Example 14 | 183 | 5.8 | 0.1 | 10.7 | 0.4 | 184 | 400 |
| Example 15 | 192 | 9.7 | 0.3 | 11.1 | 0.5 | 114 | 167 |
| Example 16 | 191 | 8.6 | 0.3 | 8.8 | 0.4 | 102 | 133 |
| Example 17 | 189 | 8.4 | 0.2 | 10.0 | 0.4 | 119 | 200 |
| Example 18 | 188 | 8.9 | 0.3 | 9.5 | 0.3 | 107 | 100 |
| Example 19 | 186 | 8.4 | 0.2 | 8.4 | 0.3 | 100 | 150 |
| Example 20 | 185 | 6.8 | 0.2 | 8.3 | 0.3 | 122 | 150 |
| Example 21 | 183 | 8.1 | 0.3 | 9.6 | 0.3 | 119 | 100 |
| Example 22 | 188 | 7.9 | 0.2 | 10.7 | 0.4 | 135 | 200 |
| Example 23 | 188 | 7.4 | 0.2 | 10.1 | 0.3 | 136 | 150 |
| Example 24 | 186 | 7.2 | 0.2 | 10.3 | 0.3 | 143 | 150 |
| Example 25 | 188 | 7.6 | 0.2 | 10.3 | 0.4 | 136 | 200 |
| Example 26 | 186 | 7.3 | 0.2 | 9.2 | 0.4 | 126 | 200 |
| Example 27 | 188 | 7.4 | 0.2 | 9.9 | 0.4 | 134 | 200 |
| Example 28 | 185 | 7.9 | 0.2 | 10.1 | 0.4 | 128 | 200 |
| Example 29 | 188 | 8.0 | 0.2 | 9.8 | 0.3 | 123 | 150 |
| Example 30 | 185 | 7.2 | 0.2 | 9.5 | 0.3 | 132 | 150 |
| Example 31 | 188 | 8.0 | 0.2 | 9.0 | 0.3 | 113 | 150 |
| Example 32 | 185 | 7.5 | 0.2 | 9.7 | 0.4 | 129 | 200 |
| Example 33 | 188 | 7.2 | 0.2 | 9.1 | 0.3 | 126 | 150 |
| Example 34 | 185 | 7.3 | 0.2 | 9.0 | 0.2 | 123 | 100 |
| Example 35 | 188 | 9.1 | 0.3 | 9.1 | 0.4 | 100 | 133 |
| Example 36 | 185 | 6.5 | 0.2 | 9.5 | 0.4 | 146 | 200 |

TABLE 7

|  | Melting point (° C.) | Initial Max Force (N) | Initial Absorbed E (mJ) | Aging Max Force (N) | Aging Absorbed E (mJ) | Rate of change Max Force (%) | Rate of change Absorbed E (%) |
|---|---|---|---|---|---|---|---|
| Comparative Example 1 | 185 | 9.5 | 2.9 | 7.7 | 2.2 | 81 | 76 |
| Comparative Example 2 | 139 | 10.9 | 4.6 | 9.0 | 3.1 | 83 | 67 |
| Comparative Example 3 | 219 | 10.0 | 4.9 | 8.3 | 3.7 | 83 | 76 |
| Comparative Example 4 | 195 | 11.3 | 4.4 | 7.8 | 2.0 | 69 | 45 |
| Comparative Example 5 | 180 | 11.2 | 4.2 | 9.2 | 2.8 | 82 | 67 |
| Comparative Example 6 | 194 | 12.4 | 5.5 | 9.4 | 2.9 | 76 | 53 |
| Comparative Example 7 | 178 | 12.0 | 4.3 | 10.1 | 3.5 | 84 | 81 |
| Comparative Example 8 | 194 | 12.5 | 3.9 | 10.1 | 3.3 | 81 | 85 |
| Comparative Example 9 | 176 | 9.7 | 3.3 | 7.3 | 2.4 | 75 | 73 |
| Comparative Example 10 | 194 | 11.8 | 4.2 | 9.3 | 3.0 | 79 | 71 |
| Comparative Example 11 | 175 | 12.2 | 4.8 | 10.3 | 3.6 | 84 | 75 |
| Comparative Example 12 | 185 | 9.8 | 3.3 | 8.1 | 2.5 | 83 | 76 |
| Comparative Example 13 | 185 | 10.8 | 3.4 | 8.5 | 2.7 | 79 | 79 |
| Comparative Example 14 | 185 | 10.8 | 4.1 | 9.1 | 3.0 | 84 | 73 |

TABLE 8

| | Melting point (° C.) | Initial | | Aging | | Rate of change | |
|---|---|---|---|---|---|---|---|
| | | Max Force (N) | Absorbed E (mJ) | Max Force (N) | Absorbed E (mJ) | Max Force (%) | Absorbed E (%) |
| Comparative Example 1 | 185 | 6.6 | 0.2 | 6.3 | 0.2 | 95 | 100 |
| Comparative Example 2 | 139 | 10.8 | 0.4 | 8.3 | 0.3 | 77 | 75 |
| Comparative Example 3 | 219 | 13.6 | 0.9 | 10.9 | 0.6 | 80 | 67 |
| Comparative Example 4 | 195 | 7.0 | 0.2 | 5.5 | 0.1 | 79 | 50 |
| Comparative Example 5 | 180 | 10.8 | 0.4 | 8.5 | 0.3 | 79 | 75 |
| Comparative Example 6 | 194 | 11.8 | 0.5 | 8.7 | 0.3 | 74 | 60 |
| Comparative Example 7 | 178 | 10.0 | 0.3 | 8.4 | 0.2 | 84 | 67 |
| Comparative Example 8 | 194 | 10.4 | 0.4 | 8.1 | 0.2 | 78 | 50 |
| Comparative Example 9 | 176 | 8.4 | 0.3 | 6.1 | 0.1 | 73 | 33 |
| Comparative Example 10 | 194 | 9.7 | 0.3 | 8.1 | 0.2 | 84 | 67 |
| Comparative Example 11 | 175 | 8.5 | 0.3 | 6.3 | 0.2 | 74 | 67 |
| Comparative Example 12 | 185 | 7.7 | 0.3 | 6.2 | 0.2 | 81 | 67 |
| Comparative Example 13 | 185 | 8.8 | 0.3 | 7.2 | 0.2 | 82 | 67 |
| Comparative Example 14 | 185 | 9.6 | 0.3 | 7.5 | 0.2 | 78 | 67 |

<Observation of Cross Section of Solder Joint Part>

Using the solder alloys obtained in Examples 1, 3, and 4 and Comparative Examples 4 and 5, measurement samples were prepared in the same manner as in 1) to 3) in <Impact shear test>. Cross sections of the measurement samples were photographed by SEM. Images of the obtained SEM photographs are shown in FIGS. 1 to 4 and 9 to 12.

<Iron Corrosion Evaluation>

A flux (NS-65 manufactured by NIHON SUPERIOR CO., LTD.) was applied to a thin piece (made of pure iron, width 10 mm×length 50 mm×thickness 20 μm) that corresponds to a nozzle, and then the resultant thin piece was plated with tin. The thin piece plated with tin was used as a test piece in the test described below.

The solder alloys of Examples 23 to 26 and Comparative Examples 1 and 2 were prepared, and about 1 kg of each solder alloy was placed in a solder chamber and heated at 220° C., to prepare a molten metal of the solder alloy.

The test piece was fixed to the tip of a bar-shaped rotating body of a screw-type stirrer (BL600 manufactured by SHINTO Scientific Co. Ltd. (HEIDON)) and the test piece was immersed so that the immersion depth of the test piece was 40 mm. At this time, the bar-shaped rotating body was rotated at 50 rpm about the central axis that extends in the length direction thereof and serves as the rotation axis. The central axis was tilted by 100 with respect to the liquid surface of the molten solder. After 120 minutes, the difference in an area of the immersed portion of the test piece before and after the immersion was regarded as an erosion amount of iron to calculate an iron decrease rate, and a corrosion (iron corrosion) degree was evaluated. The area of the immersed portion of the test piece before and after the immersion was measured with a digital microscope VHX-7000 manufactured by KEYENCE CORPORATION. The iron decrease rate was calculated in a manner described below. Table 9 shows the evaluation results. The evaluation reference was set as follows. An iron decrease rate of less than 5.0% was evaluated as "○", an iron decrease rate of 5.0% or more and less than 10.0% was evaluated as "Δ", and an iron decrease rate of 10.0% or more was evaluated as "×".

Iron decrease rate (%)=(Area before immersion−Area after immersion)/Area to be immersed before immersion× 100

TABLE 9

| | Decreased area (%) | Determination result |
|---|---|---|
| Example 23 | 3.2 | ○ |
| Example 24 | 0.8 | ○ |
| Example 25 | 3.9 | ○ |
| Example 26 | 1.4 | ○ |
| Comparative Example 1 | 7.7 | × |
| Comparative Example 2 | 10.1 | × |

<Wettability Evaluation>

Using solder samples (diameter: 6.5 mm$^{SM}$, height: 1.24 mm) prepared with use of the respective solder alloys of Example 22 and Comparative Examples 7 and 11 to 14, an expansion rate (%) was calculated in accordance with JIS Z 3198-3 and evaluated. The evaluation reference was set as follows. An expansion rate of 80.0% or more was evaluated as "○", an expansion rate of 75.0% or more and less than 80.0% was evaluated as "Δ", and an expansion rate of less than 75.0% was evaluated as "×". Table 10 shows the evaluation results.

TABLE 10

| | Expansion rate (%) | Determination result |
|---|---|---|
| Example 22 | 83.1 | ○ |
| Comparative Example 7 | 72.6 | × |
| Comparative Example 11 | 75.4 | Δ |
| Comparative Example 12 | 78.9 | Δ |
| Comparative Example 13 | 71.4 | × |
| Comparative Example 14 | 75.5 | Δ |

<Oxide Film Thickness Test>

A molten solder of each of the solder alloys of Examples 27 to 36 and Comparative Examples 8 to 10, 13, and 14 was poured into a mold, to obtain a test piece (width 2 cm×length 10 cm×thickness 1 cm). Using an oxide film thickness measurement device (Surface Scan SERA QC-100 manufactured by ECI TECHNOLOGY), the thickness of the oxide film (total of SnO and $SnO_2$) on the surface of the test piece on the preparation day thereof was measured to obtain an initial film thickness Do. Then, the test piece was exposed to an environment having a room temperature of 25° C. and a humidity of 65% for 168 hours, to be allowed to undergo natural oxidation. Then, the thickness of the oxide film was measured again in the same manner as above to obtain a post-exposure film thickness D. The rate of change (D/$D_0$× 100) relative to the initial film thickness Do was calculated and evaluated. The evaluation reference was set as follows. With respect to the rate of change in the thickness of the oxide film on the surface of the solder alloy before and after the exposure, said rate of change being less than 25% was evaluated as "○", said rate of change being 25% or more and less than 50% was evaluated as "Δ", and said rate of change being 50% or more was evaluated as "×". Table 11 shows the evaluation results.

TABLE 11

|  | Rate of change (%) | Determination result |
|---|---|---|
| Example 27 | 8 | ○ |
| Example 28 | 6 | ○ |
| Example 29 | 7 | ○ |
| Example 30 | 6 | ○ |
| Example 31 | 8 | ○ |
| Example 32 | 7 | ○ |
| Example 33 | 7 | ○ |
| Example 34 | 6 | ○ |
| Example 35 | 7 | ○ |
| Example 36 | 6 | ○ |
| Comparative Example 8 | 35 | Δ |
| Comparative Example 9 | 31 | Δ |
| Comparative Example 10 | 34 | Δ |
| Comparative Example 13 | 72 | × |
| Comparative Example 14 | 58 | × |

Figure 13A:
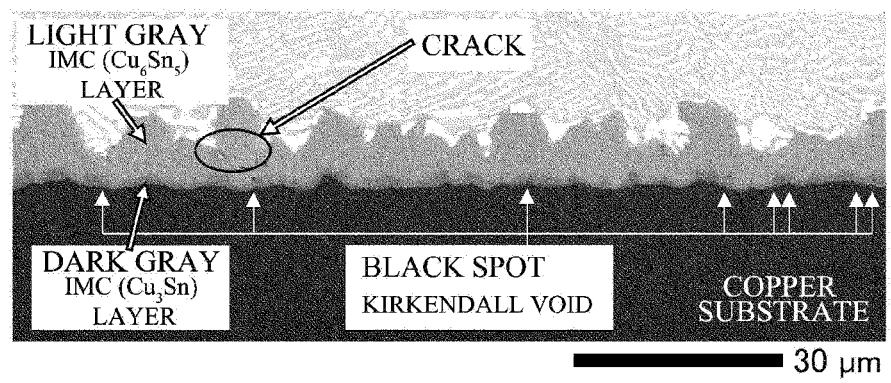
FIG. 13A is an illustration for describing the image of FIG. 11B.
Figure 13B:
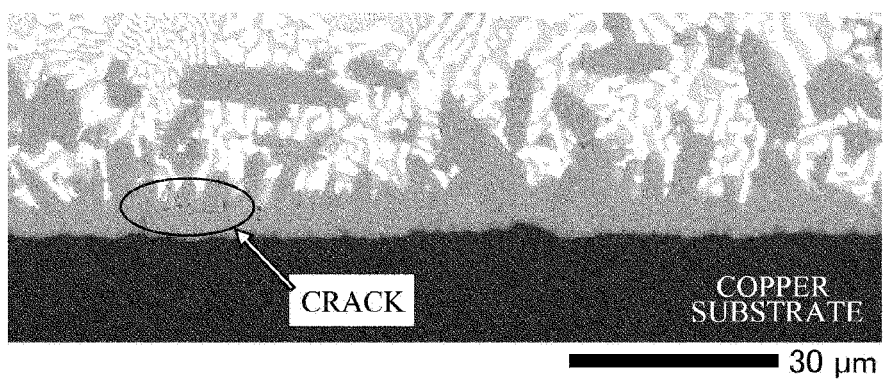
FIG. 13B is an illustration for describing the image of FIG. 12B.

According to Tables 4 to 8 and FIGS. 5 to 8, when Sn is used as a parent phase and Bi, Sb, Cu, and Ni are contained in amounts in specific ranges, the solder alloy has a good shear load stress, and also after the aging, has a shear stress equivalent to or greater than that in the initial state. FIGS. 1 to 4 reveal that occurrence of voids is inhibited in the initial state and after the aging. In particular, when the intermetallic compound (IMC) layer of $Cu_6Sn_5$ depicted in light gray in the illustration in FIG. 13A is focused, a large number of Kirkendall voids are observed, after the aging treatment of Comparative Example 4, as black spots at the IMC layer of $Cu_3Sn$ depicted in dark gray, on the surface of the black copper substrate. This is caused by the fact that Comparative Example 4 has the greatest amount of Sn among Examples 3 and 4 and Comparative Examples 4 and 5, and copper is most diffused with Sn in the solder. It is known that a Kirkendall void can be a start point of stress concentration, and a crack is observed near a Kirkendall void in FIG. 13A. After the aging treatment of Comparative Example 5, no Kirkendall void is observed as shown in FIG. 13B, but a crack is observed in the IMC layer of $Cu_6Sn_5$ depicted in light gray. This may be caused by Bi, which is hard, being concentrated in the vicinity of the joining interface, thus causing a load of stress to be easily applied to the IMC layer. Meanwhile, with reference to FIGS. 9 and 10, in the case of the solder alloys of Examples 3 and 4, no cracks or Kirkendall voids are observed in the IMC layer of $Cu_6Sn_5$ depicted in light gray. Further, according to Table 9, when Fe and Co are contained in amounts in predetermined ranges, iron corrosion can also be inhibited. According to Table 10, when Ag is contained in an amount in a predetermined range, wettability can also be improved. According to Table 11, when Ga. Mn, V, P, and Ge are contained in amounts in predetermined ranges, oxidation of the surface of the solder alloy can also be inhibited. Thus, the solder alloy having a component composition in the specific ranges as described above has a low melting point based on the content of Bi. In addition, deterioration of the solder alloy in long-term use is inhibited, and the solder alloy can have good thermal fatigue resistance. Accordingly, a highly reliable solder joint part can be formed. Further, when predetermined arbitrary elements are contained in amounts in predetermined ranges in addition to essential components of Sn, Bi, Sb, Cu, and Ni, functions unique to the arbitrary elements can be exhibited in addition to the functions based on the essential components.

The invention claimed is:

1. A lead-free solder alloy consisting of:
   32 mass % or more and 40 mass % or less of Bi;
   0.1 mass % or more and 1.0 mass % or less of Sb;
   0.1 mass % or more and 1.0 mass % or less of Cu;
   0.001 mass % or more and 0.1 mass % or less of Ni;
   optionally one of
      0.3 mass % or less of Ag,
      at least one selected from Fe and Co, wherein a content of Fe and Co is 0.001 mass % or more and 0.1 mass % or less, and
      at least one selected from Ga, Mn, V, P, and Ge, wherein a content of each of Ga, Mn, V, P, and Ge is 0.001 mass % or more and 0.01 mass % or less; and
   a remainder of Sn with unavoidable impurities,
   wherein a rate of change of max force of the lead-free solder alloy after aging at 150° C. for 100 hours is 100% or more and 184% or less in an impact sheer test with a shear speed at 1000 mm/s.

2. The lead-free solder alloy according to claim 1 wherein Ag is present in an amount of 0.3 mass % or less.

3. The lead-free solder alloy according to claim 1 wherein at least one selected from Fe and Co is present, wherein a content of each of Fe and Co is 0.001 mass % or more and 0.1 mass % or less.

4. The lead-free solder alloy according to claim 1 wherein at least one selected from Ga, Mn, V, P, and Ge is present, wherein a content of each of Ga, Mn, V, P, and Ge is 0.001 mass % or more and 0.01 mass % or less.

5. The lead-free solder alloy according to claim 1, having 36 mass % or more and 38 mass % or less of Bi.

6. The lead-free solder alloy according to claim 2, having 36 mass % or more and 38 mass % or less of Bi.

7. The lead-free solder alloy according to claim 3, having 36 mass % or more and 38 mass % or less of Bi.

8. The lead-free solder alloy according to claim 4, having 36 mass % or more and 38 mass % or less of Bi.

9. A solder joint part comprising the lead-free solder alloy according to claim 1.

10. A solder joint part comprising the lead-free solder alloy according to claim 2.

11. A solder joint part comprising the lead-free solder alloy according to claim 3.

12. A solder joint part comprising the lead-free solder alloy according to claim 4.

* * * * *